(12) United States Patent
Badesha et al.

(10) Patent No.: US 7,046,934 B2
(45) Date of Patent: May 16, 2006

(54) OPTICAL COMMUNICATION SYSTEM USING A HIGH ALTITUDE TETHERED BALLOON

(75) Inventors: Surjit S. Badesha, Columbia, MD (US); Andrew D. Goldfinger, Baltimore, MD (US); Thomas W. Jerardi, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 677 days.

(21) Appl. No.: 10/188,631

(22) Filed: Jul. 3, 2002

(65) Prior Publication Data

US 2002/0167702 A1    Nov. 14, 2002

Related U.S. Application Data

(63) Continuation-in-part of application No. PCT/US01/00559, filed on Jan. 9, 2001.

(60) Provisional application No. 60/175,268, filed on Jan. 10, 2000.

(51) Int. Cl.
*H04B 10/00* (2006.01)

(52) U.S. Cl. ............... 398/121; 398/122; 398/125; 398/129; 398/131

(58) Field of Classification Search ............ 398/121, 398/122, 125, 129, 131, 128; 342/53–54, 342/159, 367
See application file for complete search history.

(56) References Cited

U.S. PATENT DOCUMENTS

| | | | | |
|---|---|---|---|---|
| 4,995,572 A | * | 2/1991 | Piasecki | 244/2 |
| 5,186,414 A | * | 2/1993 | Holzschuh et al. | 244/3.12 |
| 5,390,040 A | * | 2/1995 | Mayeux | 398/129 |
| 5,587,929 A | * | 12/1996 | League et al. | 342/159 |
| 5,909,299 A | * | 6/1999 | Sheldon et al. | 398/125 |
| 6,010,093 A | * | 1/2000 | Paulson | 244/24 |
| 6,195,044 B1 | * | 2/2001 | Fowell | 342/367 |

* cited by examiner

*Primary Examiner*—Kenneth Vanderpuye
*Assistant Examiner*—Dzung Tran
(74) *Attorney, Agent, or Firm*—Albert J. Fasulo, II

(57) ABSTRACT

An optical communication system using a high altitude tethered balloon 10 that operates above most clouds and atmospheric turbulence. An optical communication system includes a balloon 10 with an optical communication payload 30, a fiber optic cable attached to the tether 12, an automated winch system 14, and a ground station 28. The balloon 10 is designed for sustained flight at, and recovery from, high altitude using the automated winch system 14. An acquisition, tracking and pointing (ATP) system 22 enables a balloon-based optical transceiver 24 to maintain line-of-sight optical communications with an overhead satellite 34. The optical link between the satellite 34 and the balloon 10 is an open channel. Data is transmitted to the ground station 28 from the balloon 10 through the secure fiber optic closed channel attached to the tether 12.

10 Claims, 10 Drawing Sheets

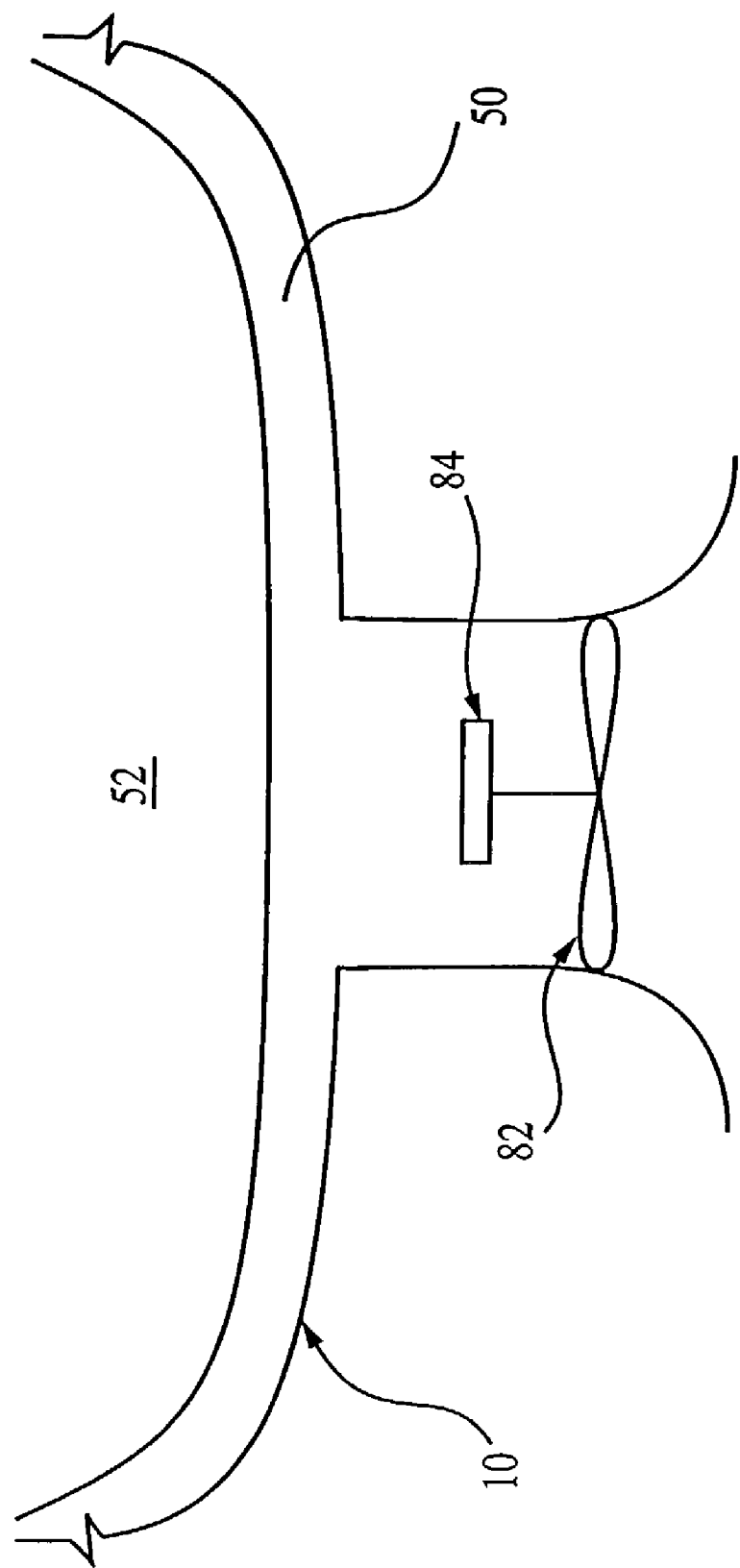

OPTICAL COMMUNICATION SYSTEM USING A HIGH ALTITUDE TETHERED BALLOON

CROSS REFERENCE TO RELATED APPLICATIONS

This application claims priority under 35 USC 120 and is a continuation-in-part of the Patent Cooperation Treaty application No. PCT/US01/00559, filed Jan. 9, 2001. This application also claims priority of U.S. Provisional Application No. 60/175,268, filed Jan. 10, 2000, which is hereby incorporated by reference in its entirety.

BACKGROUND OF THE INVENTION

1. Field of the Invention

The invention relates generally to an optical communication system using a high altitude tethered balloon for high data rate communication between ground-based and space-based or high altitude-based instrumentation.

2. Discussion of the Related Art

Optical communication systems operate at very high frequencies and are ideally suited for high bandwidth applications. Compared to radio frequency (RF) communication systems, optical communication systems also generally permit smaller and lighter system components, require less power, and are more secure. However there are significant problems associated with the operation of optical communication systems in the atmosphere. Clouds, rain and fog can scatter optical beam energy and disrupt communications. Furthermore, turbulence in the atmosphere can distort the optical beam and also cause lost communications.

Many different techniques have been proposed to mitigate problems associated with atmospheric optical communications. One approach, when communicating from a ground station to an overhead satellite, is to have several ground stations at different locations so that a transmission can be sent from the ground station that is least obstructed by clouds. However such an approach likely requires more than three stations, separated by more than 200 km, to provide a reliable transmission capability. The costs associated with this approach are prohibitive.

Another approach is to send a repeated packet of data toward a receiver. If a packet is received during a brief "scintillation window" that results in a clear line-of-sight between the transmitter and the receiver, an acknowledgement is returned to the transmitter. A subsequent packet of data is then repeatedly broadcast until it is received. However this approach is only able to establish communications through the atmosphere for very brief periods, thus high data rate communications are not optimized.

Tethered balloons have been used for generations for long distance communications. Historically the balloons relayed information, often simply visual observations, from one point on the ground to another. Ground-to-aircraft and ground-to-spacecraft RF communications are also relayed using balloons. However viable ground-to-spacecraft optical communications relayed via tethered balloons have not been suggested. Such balloon-relayed optical communications require overcoming both a) the above mentioned problem of atmosphere-induced optical scatter and distortion; and b) the problem of pointing and stabilizing transmitting and receiving optics in turbulent air to achieve the stable narrow beam alignment necessary for modern optical communications.

To overcome atmosphere induced scatter and distortion of optical signals, another solution is to effectively move above the atmosphere. Free flying high altitude scientific balloons have been used successfully for many years; however, very high altitude tethered balloons operating for extended periods of time in the stratosphere above much of the earth's weather have been generally unsuccessful. Only recently have practical techniques been suggested enabling tethered balloon flights at altitudes near 20 km. FIG. 1 illustrates a wind profile and ascent trajectory involved in modulating a tethered balloon through peak jet stream winds to high altitude. During such an ascent maximum tether tension occurs at the balloon-tether interface while the balloon is ascending through the range of peak winds between 8–12 km. A thorough understanding of such balloon ascent conditions is necessary to optimize the numerous parameters such as downwind displacement, tether length, free lift, balloon size, and tether and balloon materials.

Pointing and stabilizing optic communications equipment attached to a balloon is also a difficult technical challenge. At lower altitudes, the wind forces can be so severe that stable alignment of an optical transceiver is not practical.

In summary, known means of transmitting and receiving high data rate optical communications between ground and space have numerous disadvantages. No solutions have been proposed to efficiently overcome the transmission problems associated with cloud cover and atmospheric disturbances. The advantages however of optical communications are significant compared with other long distance communication methods. The high bandwidth facilitated by optical communications is becoming increasingly important in global communications. Therefore there is a need for an optical communication system that overcomes the above difficulties of optical transmission through the atmosphere.

SUMMARY OF THE INVENTION

The present invention, among other things, presents a solution to the aforementioned problems associated with the prior art.

It is an object of the present invention to operate a high altitude tethered balloon that relays optical high data rate communications between space-based and ground-based instrumentation.

A further object of the present invention is to align an optical transceiver attached to a high altitude balloon with an overhead spacecraft.

Yet another object of the present invention is to reduce atmospheric disturbances affecting optical communications between space-based and ground-based instrumentation.

An embodiment of the present invention includes an optical communication system for achieving a clear optical path between earth and space having minimal atmospheric disturbances. The optical communication system includes a high altitude balloon system comprising a balloon, an automated winch near a ground station that is operatively connected to the balloon for launching and recovering the balloon, and a tether extending from the winch to the balloon. The optical communication system further includes a ground station; a transceiver attached to the balloon for transmitting or receiving optical data to and from an overhead spacecraft; an acquisition, tracking and pointing system attached to the balloon for locating the spacecraft and for aligning the transceiver with the spacecraft using "blob coloring," thus enabling open channel optical communication between the balloon and the overhead spacecraft; and a fiber optic cable attached to the tether and extending from the balloon to the ground station, thus enabling closed channel optical communication between the balloon and the ground station.

The balloon is capable of launch to, recovery from and sustained flight above, for example, 20 km altitude. At its operating altitude the balloon is above most clouds and atmospheric turbulence and can establish a clear path of communication with spacecraft at any altitude and in any orbit. There are several basic orbits used in satellite based communications and reconnaissance. The most common communications orbit is the Geostationary Earth Orbit (GEO) at altitudes near 36,000 km. The period is equal to the rotation of the Earth so that the satellite appears to be stationary when viewed from the ground. Many Low Earth Orbit (LEO) reconnaissance/surveillance satellites are in orbit at altitudes between 500 to 1,500 km. A resulting orbital period of between 94 to 115 minutes allows about 15 minutes of uninterrupted optical data transmission time per orbit. The optical link between the satellite and the balloon is an open channel. Data is then transmitted to the ground station from the balloon through the fiber optic cable that is a secure closed channel. This embodiment makes secure ground to space optical communications possible by overcoming the problem of cloud cover and atmospheric disturbances and facilitates data transmission rates of more than 2.5 Gigabits per second (Gbps) bandwidth using current technology.

The present invention therefore provides for high data rate (HDR) optical communications including applications such as intercontinental satellite communications, communications to and from deep space, and communications with high altitude based instrumentation, aircraft or missiles.

Other objects and advantages of the invention will become more fully apparent from the following more detailed description and the appended drawings, wherein the reference numerals refer to like elements, that illustrate several embodiments of the invention. In the following description, the terms spacecraft, space-based instrumentation and satellite are interchangeable and refer to the various devices that may communicate with the high altitude balloon.

BRIEF DESCRIPTION OF THE DRAWINGS

FIG. 6 is a diagram of a pressurization system according to an embodiment of the present invention.

DETAILED DESCRIPTION OF THE INVENTION

Figure 2:
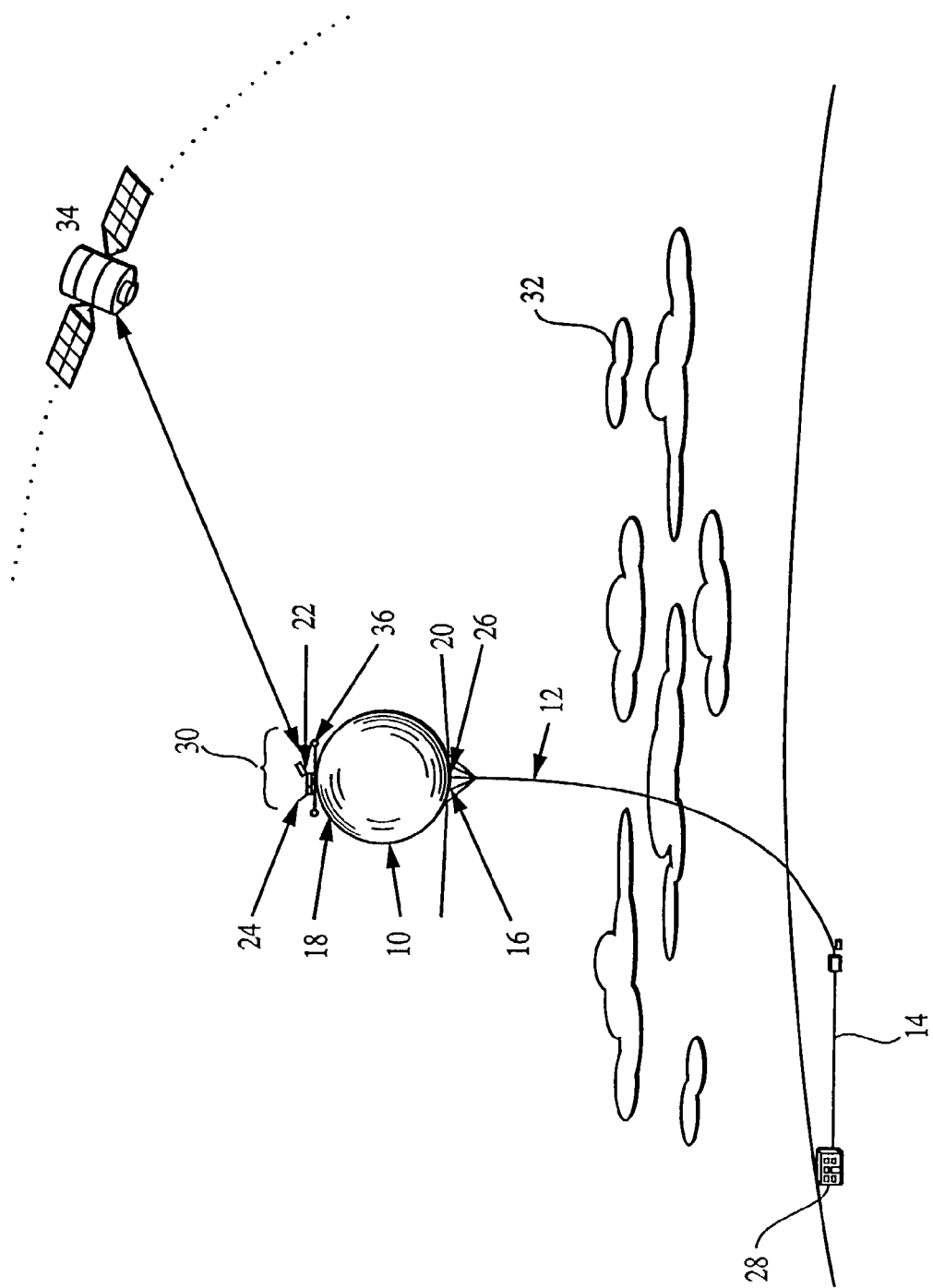
FIG. 2 is a diagram of an embodiment of an optical communication system using a high altitude tethered balloon according to the present invention.

FIG. 2 is a diagram of an embodiment of an optical communication system using a high altitude tethered balloon according to the present invention. The system includes a spherical balloon 10 attached by a tether 12 to an automated winch 14 located on the ground. A pressurization system 16 is used to maintain the differential pressure between the balloon's internal gas and the ambient atmosphere. Power for a payload 30 and the pressurization system 16 is supplied by solar array cells 18 in combination with fuel cells 20 for energy storage. The payload 30, mounted on the balloon, includes an Acquisition, Pointing and Tracking (ATP) system 22 that provides accurate position and attitude information for target tracking, and other communications equipment. Targets may include but are not limited to various space-based instrumentation 34 such as satellites, spacecraft in deep space, and high altitude airplanes and missiles. Also included in the payload are Global Positioning System (GPS) antennas 36 for determining the position and attitude of the balloon 10 in earth fixed coordinates. Optical data is communicated to and from an open channel transceiver 24 attached to the balloon 10 and aimed toward space. Open channel communication between the balloon 10 and the space-based instrumentation occurs above most clouds 32 and above most atmospheric turbulence. A fiber optic transceiver 26 attached to the balloon enables optical communications with a ground station 28 via a fiber optic cable attached to the tether 12.

Figure 3:
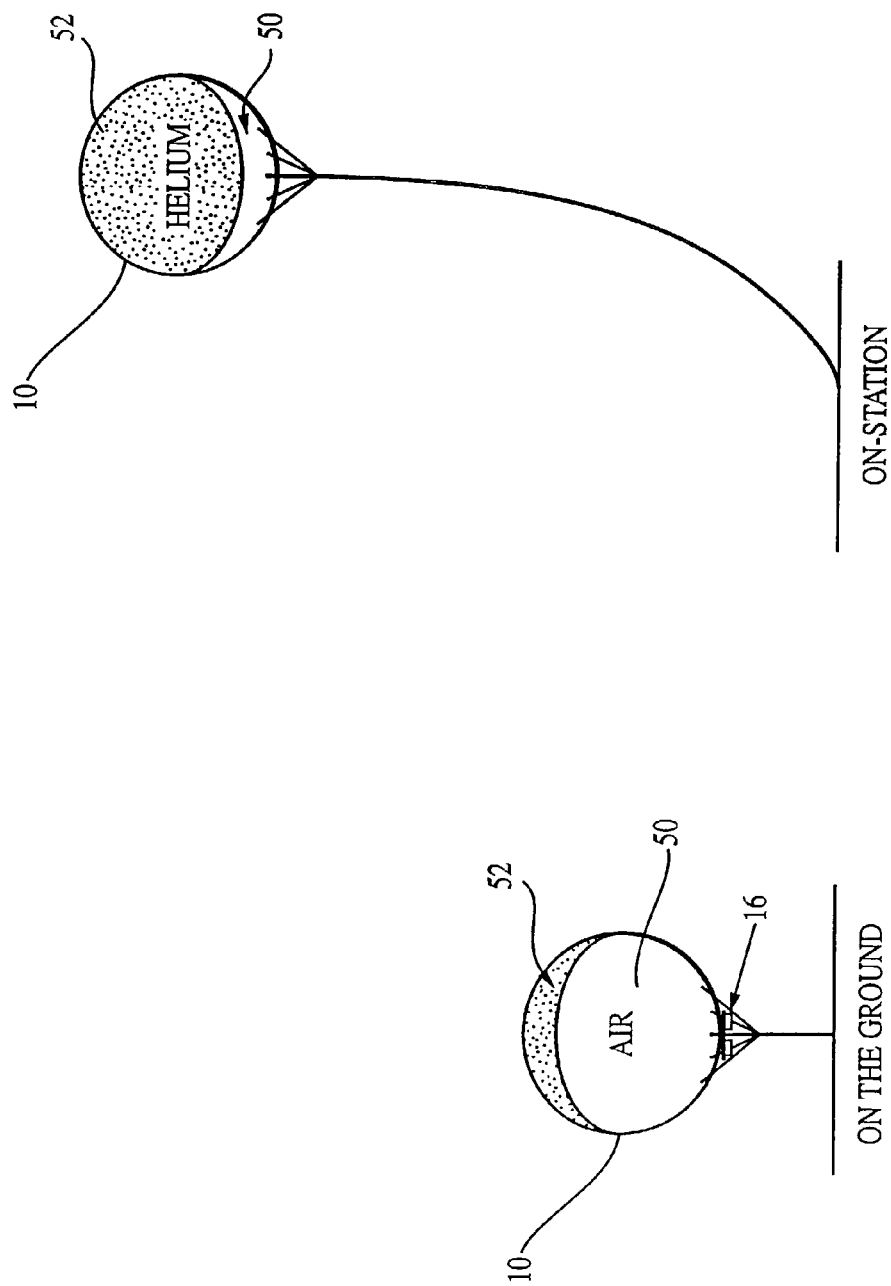
FIG. 3 is a diagram of a balloon system according to an embodiment of the present invention.

FIG. 3 is a diagram of a balloon system that can be used in the invention. Although various balloon shapes may be used, in this embodiment the balloon 10 is a spherically shaped, constant volume balloon with a ballonet 50 (a variable volume internal air compartment known in the art). The ballonet 50 allows the balloon 10 to maintain constant positive pressure throughout the entire operating regime, thus permitting the balloon's overall volume and external shape to remain nearly constant. At low altitudes, the majority of the balloon's external volume is occupied by air inside of the ballonet 50. The air in the ballonet 50 is vented during ascent, such that at higher altitudes the majority of the balloon's external volume is occupied by the helium chamber 52. Similarly, during balloon descent, the pressurization system 16 forces air into the ballonet 50 to maintain the balloon's 10 constant pressure and external shape.

A spherically shaped balloon has advantages over an aerostat (an aerodynamically shaped balloon) in that the former has the highest volume-to-surface area and the lowest skin stress-to-volume ratio of any shape. This allows the flexible structure to be fabricated with not only less material, but also very light materials. Because the balloon 10 is capable of operating at very high altitudes above most atmospheric turbulence, the balloon 10 presents a relatively stable platform for aligning optical equipment with the spacecraft 34 and enabling free space (open channel) optical communication between the balloon 10 and the spacecraft 34.

Figure 4:
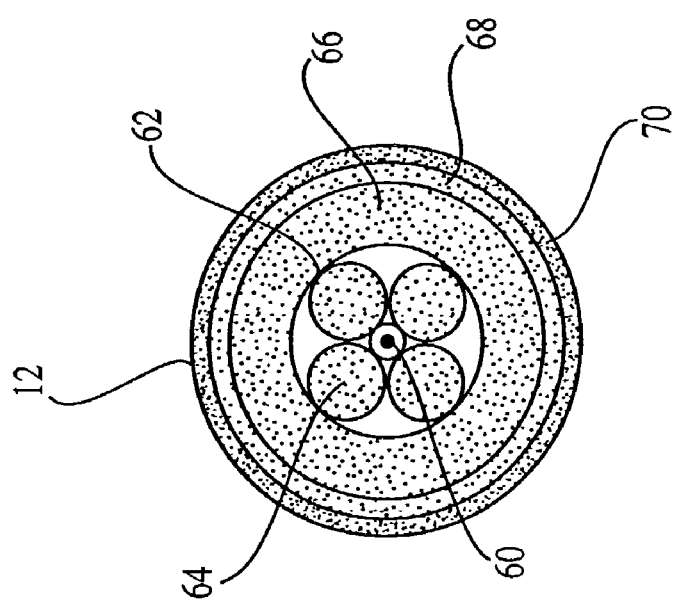
FIG. 4 is a cross section of a typical tether used in the present invention.

FIG. 4 depicts the cross-section of a typical tether 12 that can be used in the present invention. For example, a center strand 60 is surrounded by four filler strands 62. Optical fibers 64 and power conducting wire may be embedded in the filler strands 62. Encircling the filler strands 62 is a braided strength member 66. Finally, an optional lightning protection braid 68 is covered by an outer thin insulation jacket 70.

The tether 12 serves two purposes: as a structural link between the balloon 10 and the winch system 14 on the ground, and as an optical link between the balloon 10 and the ground station 28. The tether 12 can be configured, for example, as a circular cross section with a slight taper from the balloon 10 to the ground. The tether 12 is sized based on peak tether tension that occurs at the balloon-tether interface while the balloon 10 is ascending or descending through the altitudes with the highest wind speeds, generally well below the operational altitude of the balloon 10 according to the invention.

In order to effectively be above most clouds and atmospheric turbulence, the balloon 10 operates at altitudes between 12 and 21 km. These altitudes could require a corresponding tether length up to 25 km. At such length, the associated weight of the tether 12 significantly affects the design of the balloon system. New advanced materials are recommended for the tether 12 because of their excellent strength-to-weight capability. One such material is a thermoplastic, multifilament yarn, melt-spun from liquid crystal polymer that is manufactured by Hoechst Celanese under the trademark VECTRAN.

Figure 1:
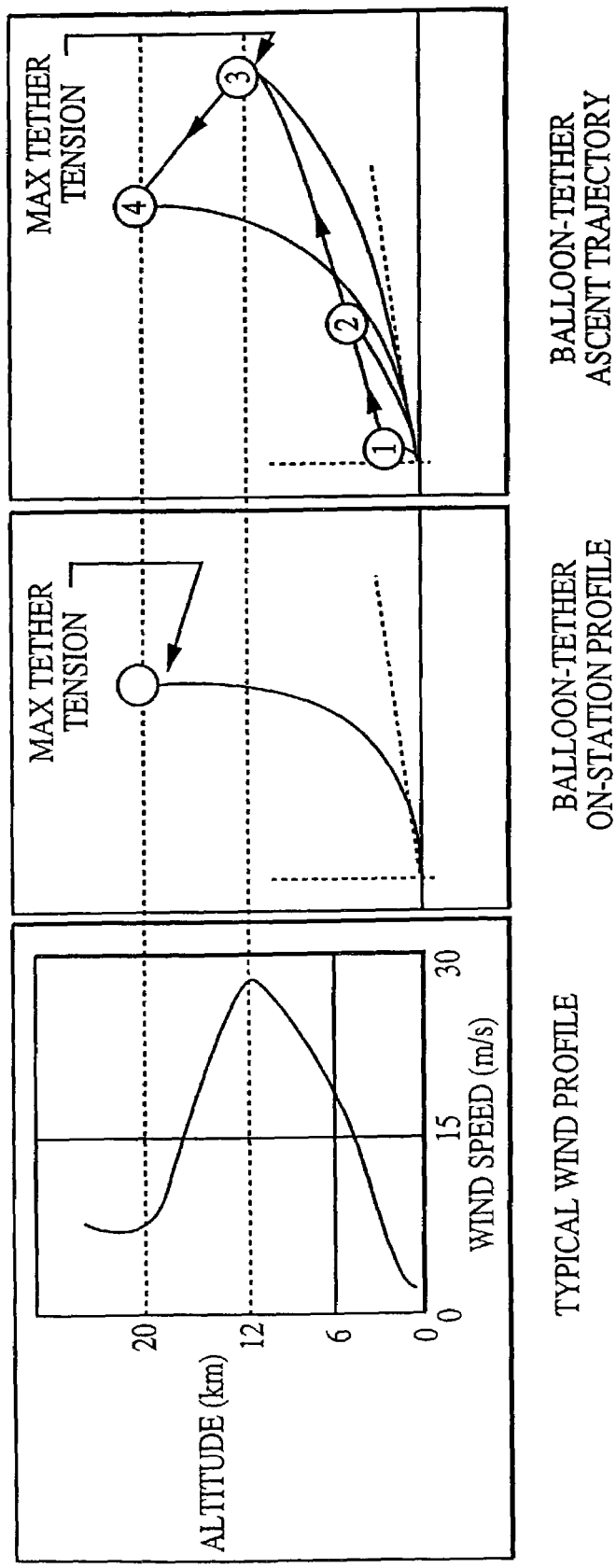
FIG. 1 is a graph of a typical wind profile and ascent trajectory involved in modulating a tethered balloon through peak jet stream winds to high altitude.

As illustrated in FIG. 1, because the balloon volume is strongly dependent on the tether weight, which is a function of the required tether strength, the entire balloon system is sized respectively to a maximum dynamic pressure condition in the wind profile.

First, the tether strength and diameter are determined. The analysis assumes a balloon of a given size is flying at an altitude corresponding to the maximum dynamic pressure in the wind profile. Knowing the aerodynamic characteristics of the balloon 10, in particular the drag coefficient, balloon size, and windspeed, the peak tether tension of the balloon 10 is computed. Combining the peak tether tension with certain tether design parameters such as diameter and weight as a function of break strength, the tether diameter required to cope with the maximum tether tension of the balloon 10 is computed taking into consideration a margin of safety for the tether 12.

Next, at successive increments of altitude decreasing from an altitude corresponding to the maximum dynamic pressure in the wind profile, the tether angle with respect to the vertical is computed, taking into consideration aerodynamic characteristics of the tether increment, its weight, and the local windspeed. This process is continued until the tether reaches the ground or the tether angle equals 90 degrees at some altitude, in which case the tether profile becomes horizontal. This method is used iteratively until a balloon and tether size are identified which result in a computation continuing to the ground with the tether angle slightly less than 90 degrees.

The automated winch 14 pays out and retrieves the tether 12, facilitating the deployment and recovery of the balloon 10. Successful recovery of the balloon 10 is an important feature of the system due to the cost of the balloon 10 and payload 30 components. An automatic winch 14 facilitates the tether 12 outhaul and inhaul modulation required during the ascent and descent phases of the flight. If during the descent of a balloon 10 the descent rate exceeds the capability of the pressurization system 16, the balloon 10 will become flaccid and the drag will increase, potentially raising the tether tension beyond allowable limits.

Figure 7:
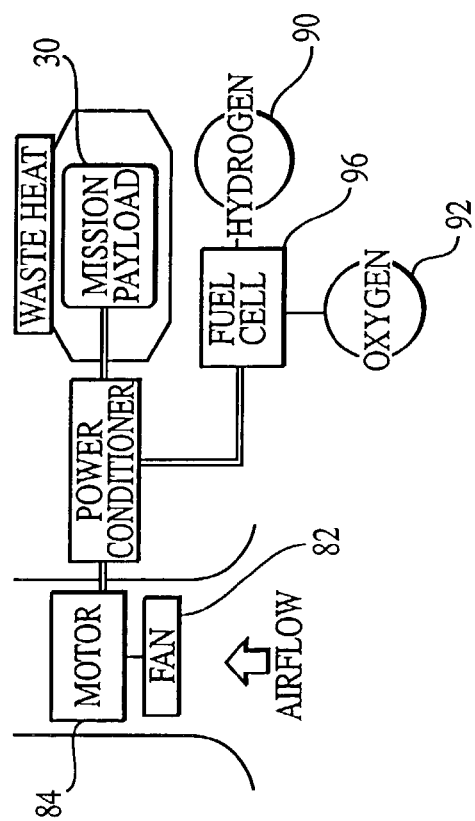
FIG. 7 is a diagram of a fuel generated power system that can be used in the present invention.

If, during the descent phase of flight, there is not enough lift to maintain tether tension as the balloon 10 enters the high wind regime (the jet-stream), the balloon 10 may be forced into an uncontrolled descent. One solution is to modulate the tether 12 speed during the descent. Actively controlling the in-haul and out-haul speed of the tether 12 can be very effective at controlling the balloon's vertical descent rate within the design envelope. As illustrated in FIG. 7, this solution leads to a phenomenon called the "jetstream related ascent/descent paradox". For example, in order to continue a controlled descent the tether direction must be reversed (paid out) and the speed modulated in such a way that the balloon 10 continues descending within the pressurization system 16 design limits.

Figure 5B:
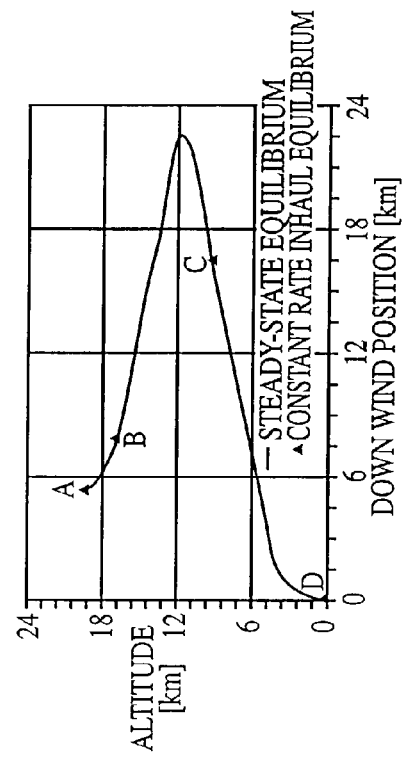
FIGS. 5A–5D are graphs showing the "jet-stream related ascent/descent paradox" associated with the present invention.
Figure 5D:
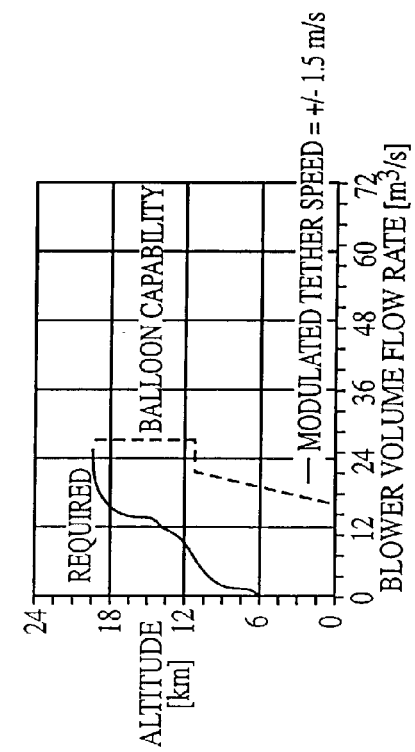
Figure 5A:
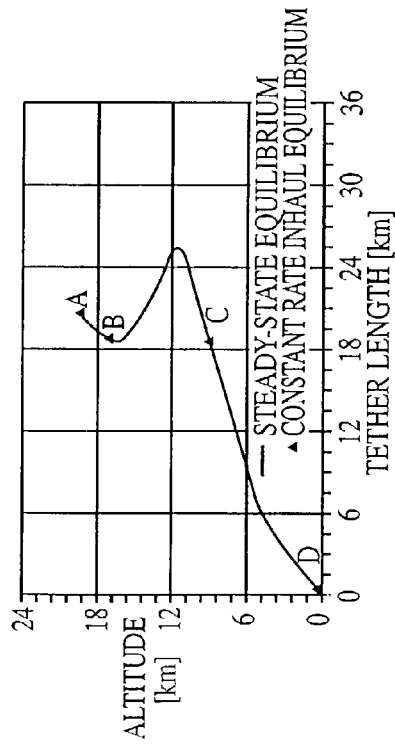
Figure 5C:
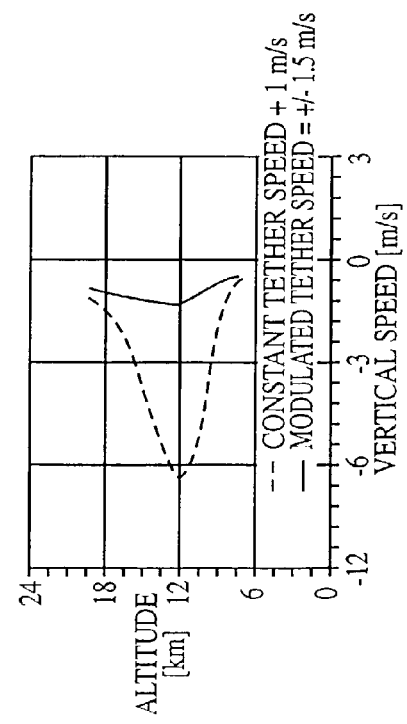

FIGS. 5A–5D illustrate the need for tether modulation during the descent (recovery) phase of the balloon system. First, consider for example the case of a 170,000 cubic meter balloon being in-hauled through the mean wind-altitude profile that is shown in FIG. 1. Referring to FIG. 5A, as the tether length is reduced from the operational altitude at point A, the balloon 10 finds new equilibrium positions between points A and B, matching the steady state equilibrium solution. However, further reduction in the tether length from position B results in a new equilibrium position at point C, at a significantly lower altitude below point B. From point C to the ground at point D, once again there is an equilibrium position corresponding to each incremental tether length reduction. Between points B and C, there is no equilibrium position that also satisfies the tether length constraint. Equilibrium can only be obtained if the tether length is greater than at point B, requiring out-haul of the tether 12. Out-hauling and in-hauling of the tether 12 (modulation) could result in the balloon following a trajectory similar to the steady state solution, as shown in FIG. 5B, depending on the modulation speed profile. However, if the tether 12 is in-hauled at a constant speed of 1 m/s, then during the critical B-C phase, there is a large decrease in tether length, resulting in the balloon's 10 vertical descent speed peaking at 6.4 m/sec, as shown in FIG. 5C. The resulting significant amount of air required beyond the capabilities of the pressurization system 16 could lead to a catastrophic failure. With the tether modulation, however, a tether in-haul/out-haul speed range of +/−1.5 m/s is sufficient to regulate the balloon's 10 vertical descent speed to less than 1.2 m/s during the critical phase of the flight (FIG. 5C). The corresponding required pressurization profile of the balloon 10, shown in FIG. 5D, is well within the capabilities of a reasonably sized pressurization system.

FIG. 6 is a diagram of one type of pressurization system 16 that can be employed in the present invention. Ambient air is pumped into the ballonet 50 by a fan 82 driven by an electric motor 84, thus modulating the size of the helium chamber 52. The size of the pressurization system 16 is dependent on the size of the balloon 10, $\Delta P$, the operational environment (temperature and windspeed variation) and the balloon's 10 descent rate during in-haul.

Successful operation of the invention requires the pressurization system 16 to maintain the differential pressure ($\Delta P$) between the balloon's internal gas and the ambient atmosphere such that the balloon 10 will be rigid enough to retain a spherical shape and limit aerodynamic drag so that the resulting tether tensions are acceptable. At the same time, the balloon material must not be overstressed by excessive pressurization. Prior aerostat experience, also applicable here, has shown that a $\Delta P$ of approximately 250

N/m² is satisfactory. The pressurization system 16 is also required to mitigate changes in ΔP due to diurnal variations in atmospheric temperature.

FIG. 7 shows an example of a fuel generated power system that can be employed in the present invention. There are numerous suitable fuel cell systems that are commercially available. The power system in FIG. 7 uses hydrogen 90 and oxygen 92 as reactants. Mixing the two in a fuel cell 96 produces power that is conditioned before being supplied to the pressurization system fan motor 84 and/or to the payload 30.

A power system is required to support the payload 30, pressurization system 16, and other electrical components of the invention. Of these, payload and pressurization require an order of magnitude greater power than the other components' functions. Historically, low altitude tethered aerostats have used powered tethers: electric power transmitted from the ground to the aerostat via a copper wire in the tether 12. However, at high altitude the weight of a powered tether could make the present invention non-feasible.

Figure 8:
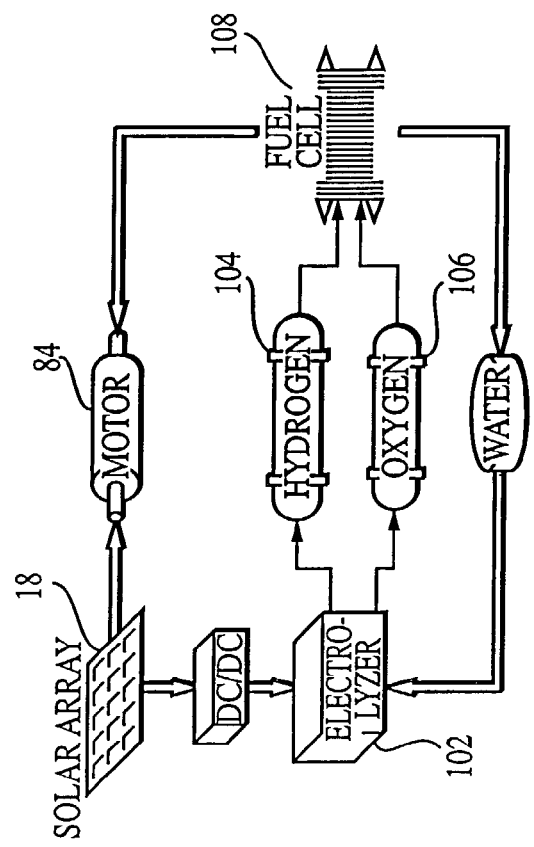
FIG. 8 is a diagram of a solar energy Regenerative Fuel Cell (RFC) power and storage system that can be used in the present invention.

FIG. 8 shows an example of a solar energy Regenerative Fuel Cell (RFC) power and storage system that can also be employed in the present invention. AeroVironment developed such a system in collaboration with NASA-Glen. The expected specific energy density of an RFC of 600 W-hr/kg, is three times that of a current state-of-the-art Lithium/Polymer battery storage system. During the day, with a water electrolyzer 102, some of the solar energy from solar array 18 is used to generate hydrogen 104 and oxygen 106 that is then stored for night use with fuel cell 108. The solar energy system, directly or indirectly, is used to power the pressurization system 16 and the payload 30.

Figure 9:
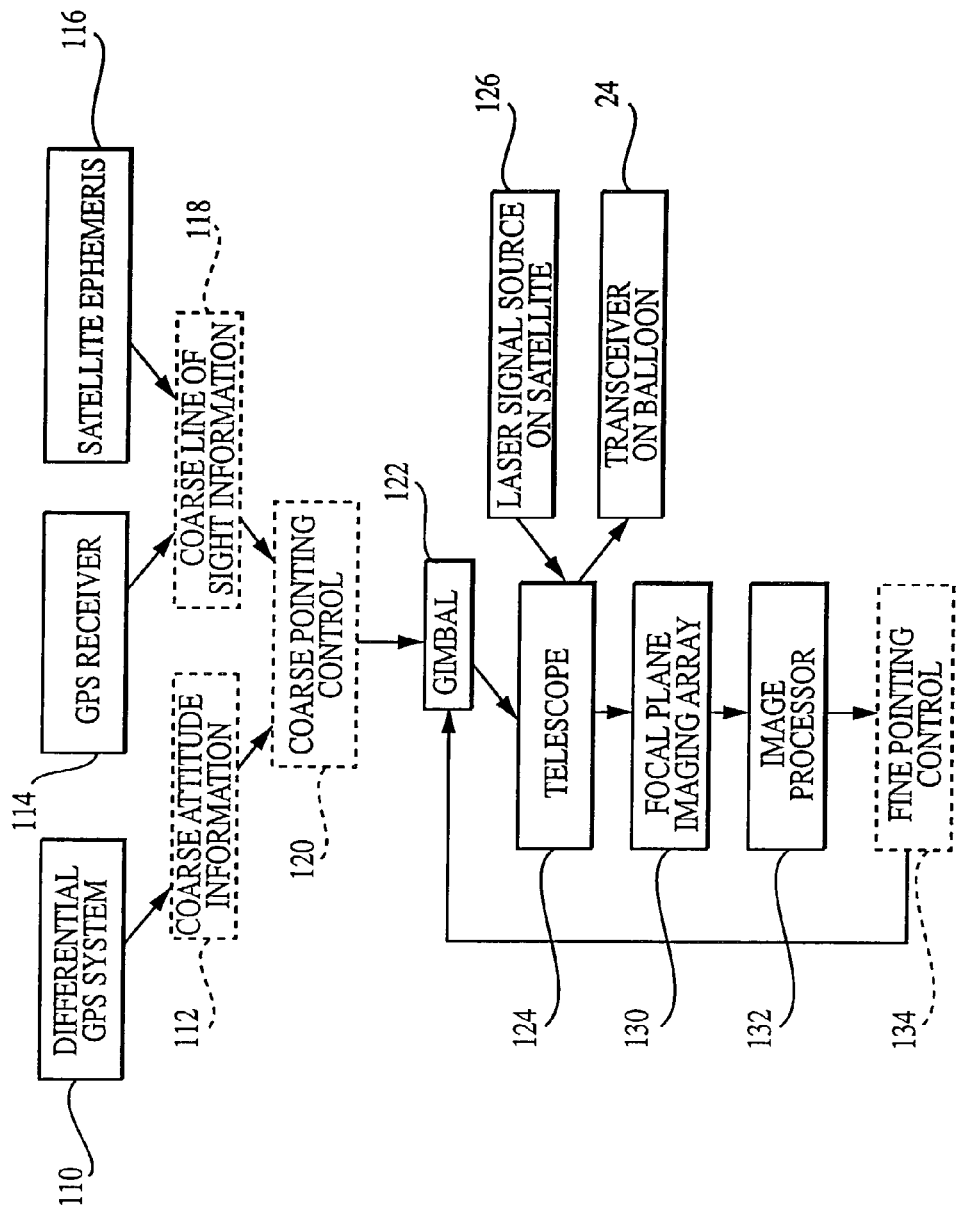
FIG. 9 is a block diagram illustrating information flow during a data downlink from space to a tethered balloon according to an embodiment of the present invention.

FIG. 9 is a block diagram illustrating information flow during a data downlink from space to the balloon 10 according to an embodiment of the present invention. The payload 30 includes the Acquisition, Tracking and Pointing (ATP) system 22, and other communications equipment such as the fiber optic transmitter terminal 26 at the balloon-end of the tether 12.

The operation of the payload 30 is as follows. First, consider the case in which a satellite 34 is the source of the optical communications signal that is received by the transceiver 24 on the balloon 10, the so-called downlink case. Mounted on the balloon 10 is a differential GPS (Global Positioning System) receiving system 110 which includes multiple GPS receiving antennas 36 and a differential GPS processor. The antennas 36 are mounted as far apart as possible as the balloon size permits enabling the differential GPS system 110 to determine the coarse attitude information 112 of the balloon 10 relative to earth fixed coordinates. Also mounted to the balloon 10 is a GPS navigation receiver 114 which provides determination of the balloon 10 position in earth fixed coordinates. Combining the position of the balloon 10 and the time with the attitude information enables the attitude of the balloon 10 to be determined in inertial coordinates. The satellite ephemeris 116 is determined by any of a number of standard methods, and it provides information about satellite position in inertial coordinates. By differencing satellite position and balloon position, the coarse line of sight 118 from the balloon 10 to the satellite 34 is determined in inertial coordinates. Combining the line of sight and the balloon attitude, a balloon body centered pointing direction is determined and this is used as a coarse pointing control 120 for a gimbal 122. The gimbal 122 points a telescope 124 towards the satellite 34 whereupon the telescope 124 receives within its field of view the optical signal source 126 on the satellite 34. An optical system consisting of the telescope 124 and its associated optics has a field of view adequate to receive the optical signal source 126 from the satellite 34 when the telescope 124 is coarsly pointed towards it. The optical components include a high bandwidth transceiver 24 that has a field of view narrower than that of the telescope 124. It is necessary to achieve fine pointing of the high bandwidth transceiver 24 towards the satellite signal source 126. This is achieved by a fine pointing system that includes a focal plane array 130 that images the signal source 126 and an image processor 132 that locates the signal source 126 within the field of view of the telescope 124.

Figure 10:
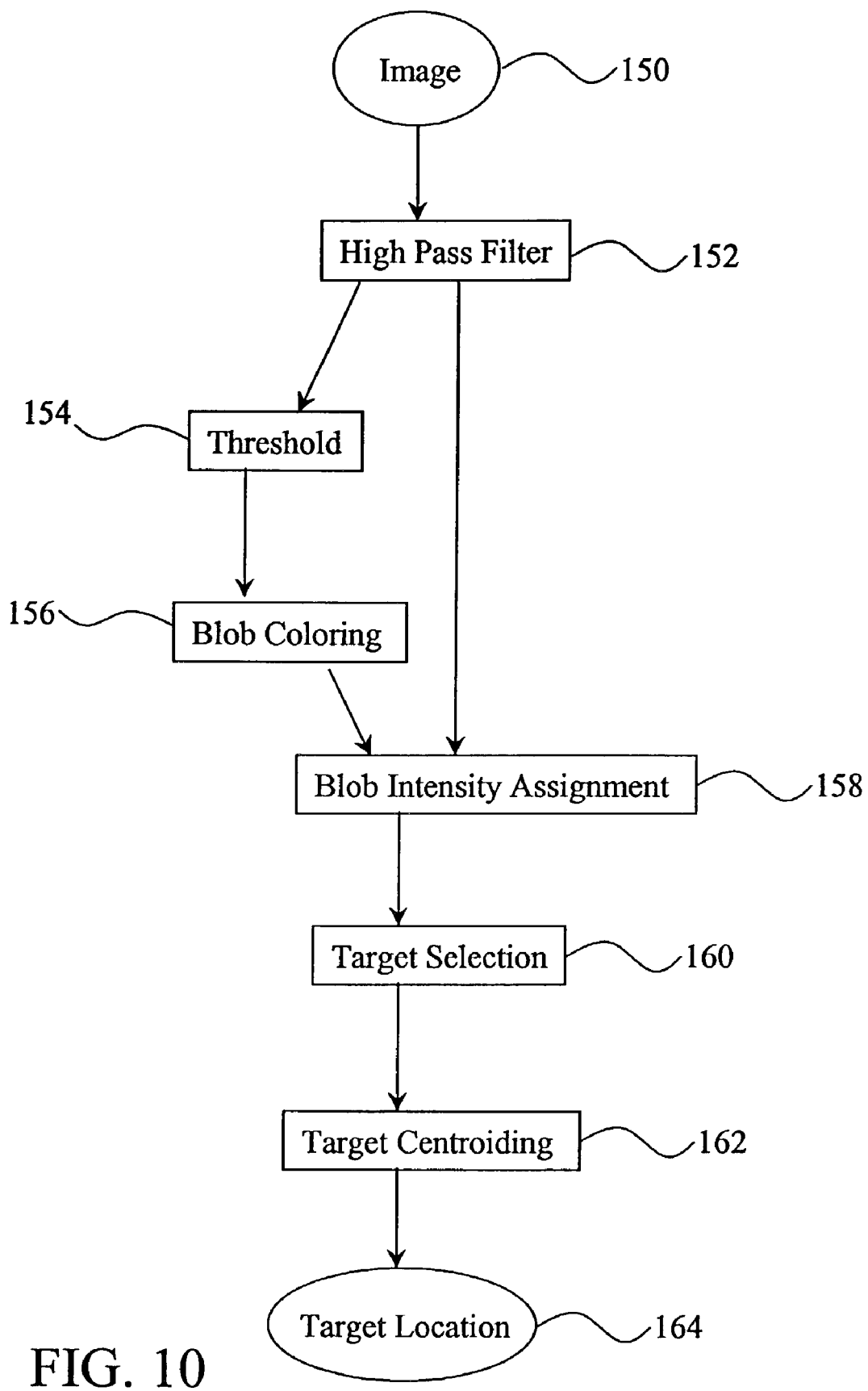
FIG. 10 is a block diagram illustrating the operation of an image processor according to an embodiment of the present invention.

An example of the operation of one embodiment of the image processor 132 is illustrated in the block diagram of FIG. 10. The image 150 must first be processed to remove any low spatial frequency background. This is done by a high pass filter 152 using any of a number of standard techniques. To identify candidates for the signal source 126 within the image, the image 150 is then thresholded adaptively (step 154). This results in an image consisting of a number of contiguous regions called "blobs" that are then individually identified through an algorithm, known to those skilled in the art, called "blob coloring" (step 156). Each blob is then assigned an intensity (step 158) by averaging the intensities of the high pass filtered image over the blob region. This results in an image consisting of a number of blobs with varying intensities. The blob with the greatest intensity is selected (step 160) as the target and centroided (step 162) to produce an estimate of target position (step 164) within the image.

From the location of the target, a change in the pointing direction of the telescope 124 is determined so as to center the signal source 126 within the narrow field of view of the high bandwidth transceiver 24. This pointing difference is used to generate a fine pointing control signal 134 that is used to steer the gimbal 122 finely so the optical signal from the satellite 126 is received by the optical transceiver 24. Alternatively, a different type of fine pointing system can be used as long as it has the capability of centering the signal source to place it within the field of view of the high bandwidth optical transceiver 24. Finally, to complete the data downlink from space to the ground station 28, the optical transceiver 24 is operatively connected to the fiber optic transmitter terminal 26 at the balloon-end of the tether 12. Data is then transmitted to the ground station 28 through the optical fibers 64 embedded in the tether 12.

An alternative to the above procedure would be to carry out all calculations in earth fixed coordinates. Thus, rather than first compute the line of sight to a satellite in inertial coordinates and then convert this to balloon body coordinates, the calculation could be done in earth fixed coordinates and then directly converted to balloon centered coordinates.

Figure 11:
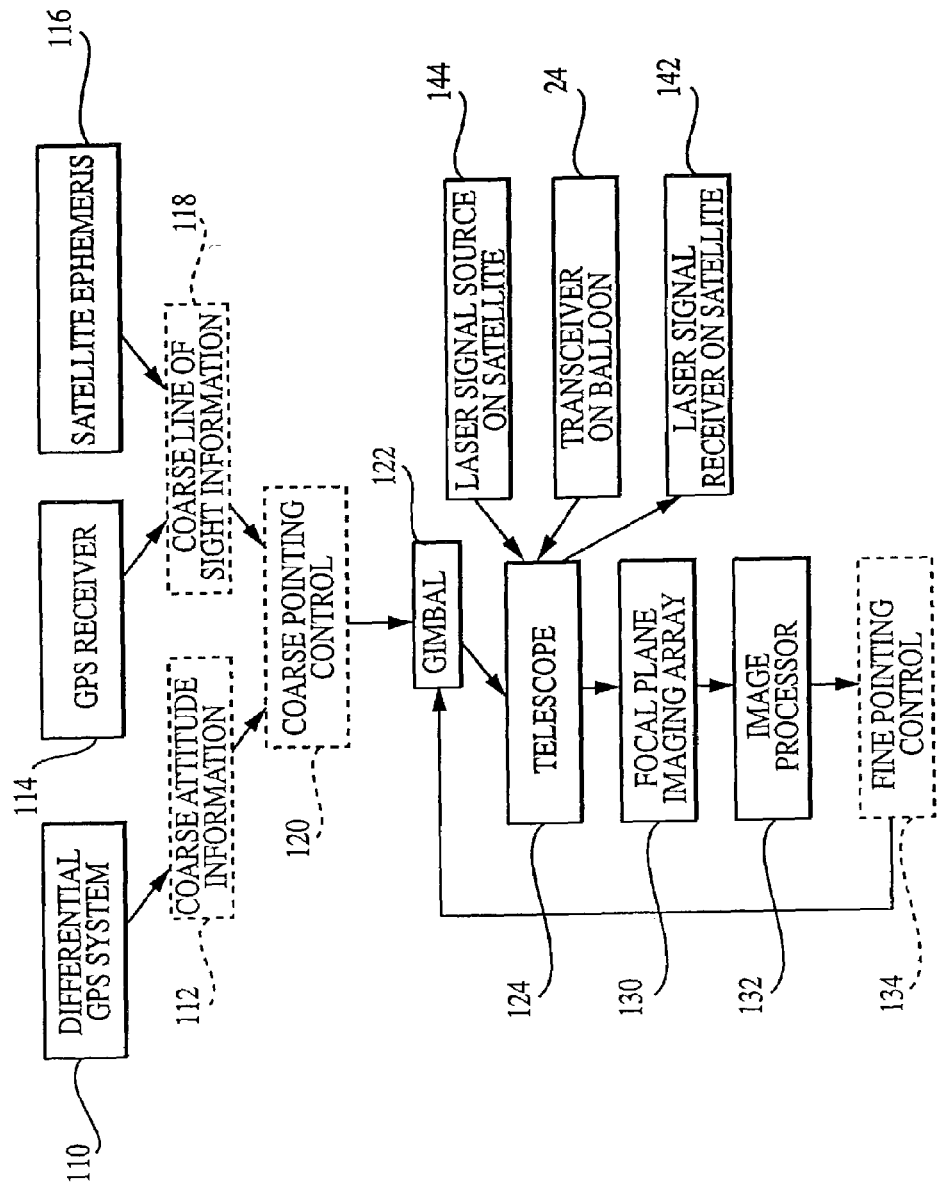
FIG. 11 is a block diagram illustrating information flow during a data uplink from a tethered balloon to space according to an embodiment of the present invention.

FIG. 11 is a block diagram illustrating information flow during a data uplink from the balloon 10 to space according to an embodiment of the present invention. The signal source is the transceiver 24 on the balloon 10 and the signal receiver 142 is on the satellite 34. In this case it is also necessary to have an optical beacon 144 on the satellite 34 to allow fine pointing of the signal at the satellite 34. The operation is similar to the downlink case, explained with respect to FIG. 9, in that the GPS receivers 110 and 114 and satellite ephemeris 116 are used to achieve coarse pointing of the gimbal 122 controlling the telescope 124. In this case, however, there is no signal coming from the satellite 34. Instead an optical beacon on the satellite 144 provides an optical signal that is used by the focal plane array 130 and image processor 132 to achieve fine pointing control 134 of the gimbal 122. The optical signal from the transceiver 24 on the balloon 10 is passed through the telescope 124 to project it towards the receiver 142 on the satellite 34.

It is also possible that a combined uplink/downlink system can be constructed. In this case, the fine pointing is achieved as with the downlink system shown in FIG. 9. Once the pointing is achieved, the telescope 124 is used to transmit the optical signal from the balloon 10 to a satellite 34 with no additional pointing needed.

In summary, the present invention provides for high data rate (HDR) optical communications between ground-based and space-based or high altitude-based instrumentation. While the above description contains many specifics, the reader should not construe these as limitations on the scope of the invention, but merely as examples of specific embodiments thereof. Those skilled in the art will envision many other possible variations that are within its scope. For example, supplying power to the payload 30 could be accomplished by other means such as long-life batteries. Accordingly, the reader is requested to determine the scope of the invention by the appended claims and their legal equivalents, and not by the specific embodiments given above.

The invention claimed is:

1. An optical communication system for achieving a clear optical path between earth and a spacecraft with minimal atmospheric disturbances, comprising:
   a ground station;
   a high altitude balloon system, said balloon system including:
      a balloon;
      an automated winch near said ground station and operatively connected to said balloon for launching and recovering said balloon; and
      a tether extending from said winch to said balloon;
   a transceiver attached to said balloon for transmitting or receiving optical data to and from the spacecraft;
   an acquisition, tracking and pointing system attached to said balloon for locating the spacecraft, said acquisition, tracking and pointing system including:
      a telescope;
      coarse pointing means, including a differential GPS system for determining a coarse attitude of said balloon relative to earth fixed coordinates, for determining based on said coarse attitude a coarse line of sight from said balloon to the satellite;
      a gimbal, operatively connected to said telescope and to said means for determining said coarse line of sight, for aligning said telescope with said coarse line of sight from said balloon to the satellite; and
      fine pointing means, using "blob coloring" of an optical signal received from the spacecraft through the coarsely aligned telescope, for further aligning said telescope with said spacecraft so as to center a field-of-view of said transceiver with the spacecraft, thereby enabling open channel optical communication between said balloon and the spacecraft; and
   a fiber optic cable attached to said tether and extending from said balloon to said ground station, enabling closed channel optical communication between said balloon and said ground station.

2. An optical communication system as recited in claim 1, wherein said fiber optic cable is embedded in said tether.

3. An optical communication system as recited in claim 1, wherein said tether is tapered between said balloon and said winch.

4. An optical communication system as recited in claim 1, wherein said balloon is spherical in shape.

5. An optical communication system as recited in claim 1, wherein said balloon is operated at an altitude between 12 and 21 km.

6. An optical communication system as recited in claim 1, wherein said high altitude balloon system further comprises:
   a ballonet; and
   a pressurization system operatively connected to said ballonet for filling and exhausting said ballonet.

7. An optical communication system as recited in claim 1, wherein the spacecraft is a satellite.

8. The system of claim 1, wherein said fine pointing means further includes:
   a focal plane array for imaging the optical signal received through the telescope as a collection of intensity "blobs"; and
   means, using said blob coloring of said intensity blobs, for centering the optical signal in the transceiver field-of-view.

9. The system of claim 1, wherein the coarse pointing means further includes:
   a GPS navigation receiver for determining a position of said balloon,
   wherein said coarse pointing means includes means for determining said coarse line of sight from said balloon to the satellite based on both said balloon coarse attitude from said DGPS and said balloon position from said GPS navigation receiver.

10. An optical communication system for achieving a clear optical path between earth and a spacecraft with minimal atmospheric disturbances, comprising:
   a ground station;
   a high altitude balloon system, said balloon system including:
      a balloon;
      an automated winch near said ground station and operatively connected to said balloon for launching and recovering said balloon; and
      a tether extending from said winch to said balloon;
   a transceiver attached to said balloon for transmitting or receiving optical data to and from the spacecraft;
   an acquisition, tracking and pointing system attached to said balloon for locating the spacecraft, said acquisition, tracking and pointing system including:
      a telescope;
      coarse pointing means, including a differential GPS system for determining a coarse attitude of said balloon relative to earth fixed coordinates, for determining based on said coarse attitude a coarse line of sight from said balloon to the satellite;
      a gimbal, operatively connected to said telescope and to said means for determining said coarse line of sight, for aligning said telescope with said coarse line of sight from said balloon to the satellite, thereby positioning an optical signal from the spacecraft within a field-of-view of said telescope; and
      fine pointing means, operatively coupled to said gimbal, using "blob coloring" for further aligning said telescope with the spacecraft so as to center the spacecraft optical signal within a FOV of said transceiver that is narrower than and within said telescope FOV, thereby enabling open channel optical communication between said balloon and the spacecraft; and
   a fiber optic cable attached to said tether and extending from said balloon to said ground station, enabling closed channel optical communication between said balloon and said ground station.

* * * * *